(12) United States Patent
Choi et al.

(10) Patent No.: US 9,853,288 B2
(45) Date of Patent: Dec. 26, 2017

(54) LITHIUM SECONDARY BATTERY

(71) Applicant: LG Chem, Ltd., Seoul (KR)

(72) Inventors: Young Geun Choi, Daejeon (KR); Geun Chang Chung, Daejeon (KR); Yourim Yoon, Daejeon (KR); Seung Jae Yoon, Daejeon (KR); Jong Mo Jung, Daejeon (KR); Jonghyun Chae, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/423,748

(22) PCT Filed: Nov. 21, 2013

(86) PCT No.: PCT/KR2013/010625
§ 371 (c)(1),
(2) Date: Feb. 25, 2015

(87) PCT Pub. No.: WO2014/081221
PCT Pub. Date: May 30, 2014

(65) Prior Publication Data
US 2015/0255794 A1    Sep. 10, 2015

(30) Foreign Application Priority Data

Nov. 21, 2012 (KR) .................... 10-2012-0132413
Nov. 21, 2013 (KR) .................... 10-2013-0142114

(51) Int. Cl.
| | |
|---|---|
| H01M 4/58 | (2010.01) |
| H01M 10/052 | (2010.01) |
| H01M 4/136 | (2010.01) |
| H01M 4/36 | (2006.01) |
| H01M 4/587 | (2010.01) |
| H01M 4/62 | (2006.01) |
| H01M 10/0525 | (2010.01) |
| H01M 4/02 | (2006.01) |

(52) U.S. Cl.
CPC ......... *H01M 4/5825* (2013.01); *H01M 4/136* (2013.01); *H01M 4/366* (2013.01); *H01M 4/587* (2013.01); *H01M 4/625* (2013.01); *H01M 10/052* (2013.01); *H01M 10/0525* (2013.01); *H01M 2004/021* (2013.01); *H01M 2220/20* (2013.01); *Y02E 60/122* (2013.01)

(58) Field of Classification Search
CPC .. H01M 4/5825; H01M 4/587; H01M 10/052; H01M 4/625; H01M 4/366; H01M 4/136; H01M 2004/021
See application file for complete search history.

(56) References Cited

U.S. PATENT DOCUMENTS

| | | | |
|---|---|---|---|
| 6,365,301 B1 | 4/2002 | Michot et al. | |
| 7,988,879 B2 | 8/2011 | Park et al. | |
| 8,153,306 B2 | 4/2012 | Kim et al. | |
| 9,466,837 B1* | 10/2016 | Yoon ..................... | H01M 4/583 |
| 2002/0150816 A1 | 10/2002 | Sakai et al. | |
| 2005/0287442 A1 | 12/2005 | Kim et al. | |
| 2006/0088761 A1 | 4/2006 | Ota et al. | |
| 2007/0003833 A1 | 1/2007 | Li et al. | |
| 2007/0059598 A1 | 3/2007 | Yang | |
| 2007/0207385 A1 | 9/2007 | Liu et al. | |
| 2008/0138713 A1 | 6/2008 | Roh et al. | |
| 2008/0206628 A1 | 8/2008 | Honbou | |
| 2010/0028783 A1 | 2/2010 | Nah | |
| 2010/0040954 A1 | 2/2010 | Amine et al. | |
| 2010/0081064 A1 | 4/2010 | Watanabe | |
| 2010/0233540 A1 | 9/2010 | Choy et al. | |
| 2010/0239900 A1 | 9/2010 | Take et al. | |
| 2010/0247990 A1 | 9/2010 | Ugaji et al. | |
| 2010/0261060 A1 | 10/2010 | Choy et al. | |
| 2011/0027651 A1 | 2/2011 | Sun et al. | |
| 2011/0059342 A1 | 3/2011 | Lee et al. | |
| 2011/0076531 A1 | 3/2011 | Lee et al. | |
| 2011/0159360 A1 | 6/2011 | Hirota et al. | |
| 2012/0114982 A1* | 5/2012 | Mitsuda ................. | H01G 9/155 429/9 |
| 2012/0183839 A1 | 7/2012 | Yuasa et al. | |
| 2012/0208092 A1 | 8/2012 | Ku et al. | |
| 2012/0237425 A1 | 9/2012 | Nishio et al. | |
| 2012/0270101 A1 | 10/2012 | Higashizaki et al. | |
| 2013/0147439 A1* | 6/2013 | Takahashi ............. | H01M 4/667 320/134 |
| 2013/0214462 A1* | 8/2013 | Kikuchi .................. | H01M 4/13 264/620 |

(Continued)

FOREIGN PATENT DOCUMENTS

| | | |
|---|---|---|
| CN | 101599557 A | 12/2009 |
| CN | 102237526 A | 11/2011 |
| CN | 102290571 A | 12/2011 |
| CN | 102332579 A | 1/2012 |
| CN | 102593518 | 7/2012 |
| EP | 2562856 A2 | 2/2013 |
| JP | H07326357 A | 12/1995 |
| JP | 2002117908 A | 4/2002 |

(Continued)

OTHER PUBLICATIONS

International Search Report for Application No. PCT/KR2013/010625 dated Mar. 7, 2014.

(Continued)

*Primary Examiner* — Muhammad S Siddiquee
(74) *Attorney, Agent, or Firm* — Lerner, David, Littenberg, Krumholz & Mentlik, LLP

(57) ABSTRACT

Disclosed is a lithium secondary battery including (i) a cathode active material including a lithium metal phosphate according to Formula 1 below; and (ii) an anode active material including amorphous carbon,

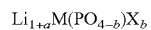

$$Li_{1+a}M(PO_{4-b})X_b \quad (1)$$

wherein M is at least one selected from metals of Groups II to XII, X is at least one selected from F, S and N, $-0.5 \leq a \leq +0.5$, and $0 \leq b \leq 0.1$.

6 Claims, 3 Drawing Sheets

(56) References Cited

U.S. PATENT DOCUMENTS

| | | | |
|---|---|---|---|
| 2013/0216902 A1* | 8/2013 | Choy | B60L 11/1879 |
| | | | 429/211 |
| 2013/0224117 A1 | 8/2013 | Royall et al. | |
| 2013/0244117 A1 | 9/2013 | Ishimaru et al. | |
| 2013/0244118 A1 | 9/2013 | Onizuka | |
| 2013/0266847 A1 | 10/2013 | Noguchi et al. | |
| 2014/0335426 A1* | 11/2014 | Kawasoe | H01M 10/0567 |
| | | | 429/336 |

FOREIGN PATENT DOCUMENTS

| | | |
|---|---|---|
| JP | 2006-120485 A | 5/2006 |
| JP | 2008-147153 A | 6/2008 |
| JP | 2008210729 A | 9/2008 |
| JP | 2009104983 A | 5/2009 |
| JP | 2009252497 A | 10/2009 |
| JP | 2009295533 A | 12/2009 |
| JP | 2010086722 A | 4/2010 |
| JP | 2011076820 A | 4/2011 |
| JP | 2012028211 A | 2/2012 |
| KR | 20060049327 A | 5/2006 |
| KR | 20080017289 A | 2/2008 |
| KR | 100863887 B1 | 10/2008 |
| KR | 20100081942 A | 7/2010 |
| KR | 20100109857 A | 10/2010 |
| KR | 20100120089 A | 11/2010 |
| KR | 20110017145 A | 2/2011 |
| KR | 20110117552 A | 10/2011 |
| KR | 20120117234 A | 10/2012 |
| WO | 2010007720 A1 | 1/2010 |
| WO | 2011052533 A1 | 5/2011 |
| WO | 2011115211 A1 | 9/2011 |
| WO | 2011132931 A2 | 10/2011 |
| WO | 2012060219 A1 | 5/2012 |
| WO | 2012070153 A1 | 5/2012 |
| WO | 2012077712 A1 | 6/2012 |
| WO | 2012114415 A1 | 8/2012 |

OTHER PUBLICATIONS

International Search Report for Application No. PCT/KR2013/010627 dated Mar. 10, 2014.
Extended Search Report from European Application No. 13857167.4, dated Mar. 2, 2016.

* cited by examiner

【FIG. 1】
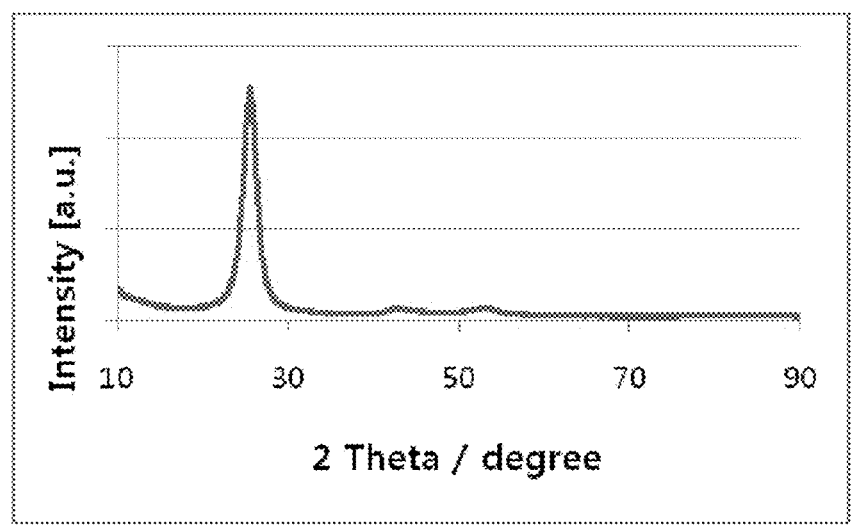
【FIG. 2】
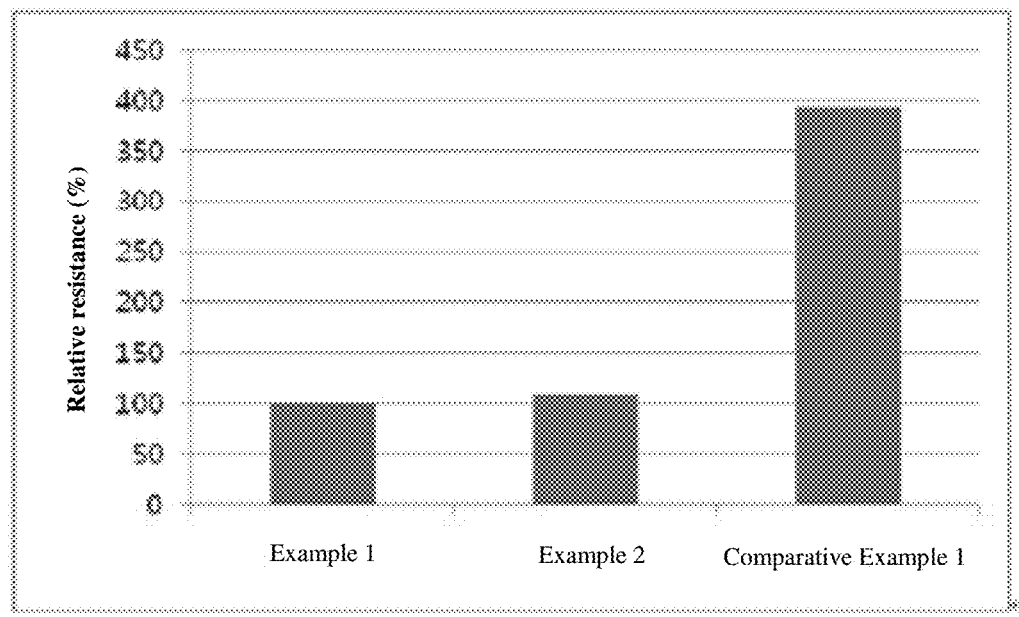

【FIG. 3】
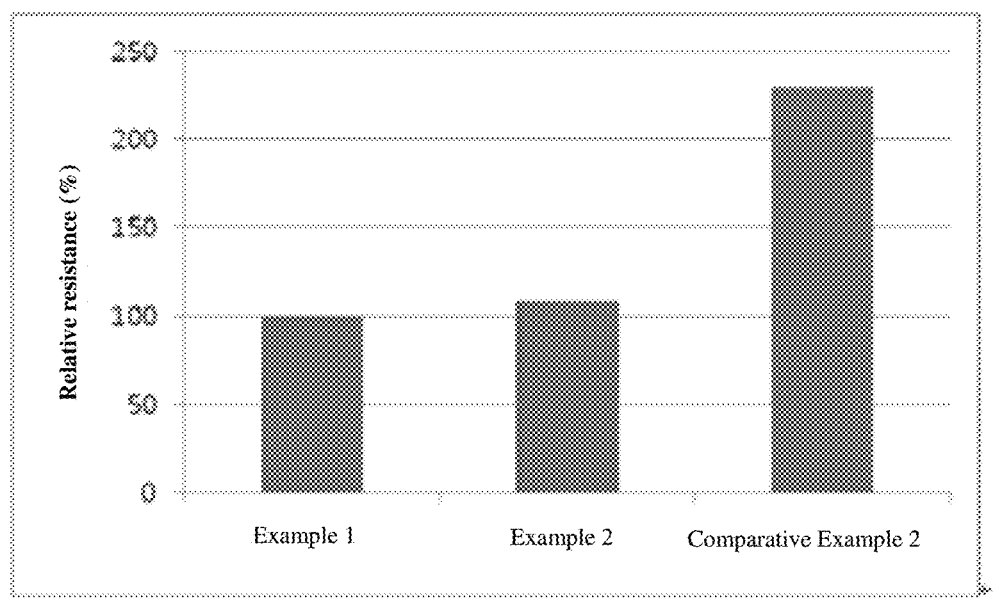
【FIG. 4】
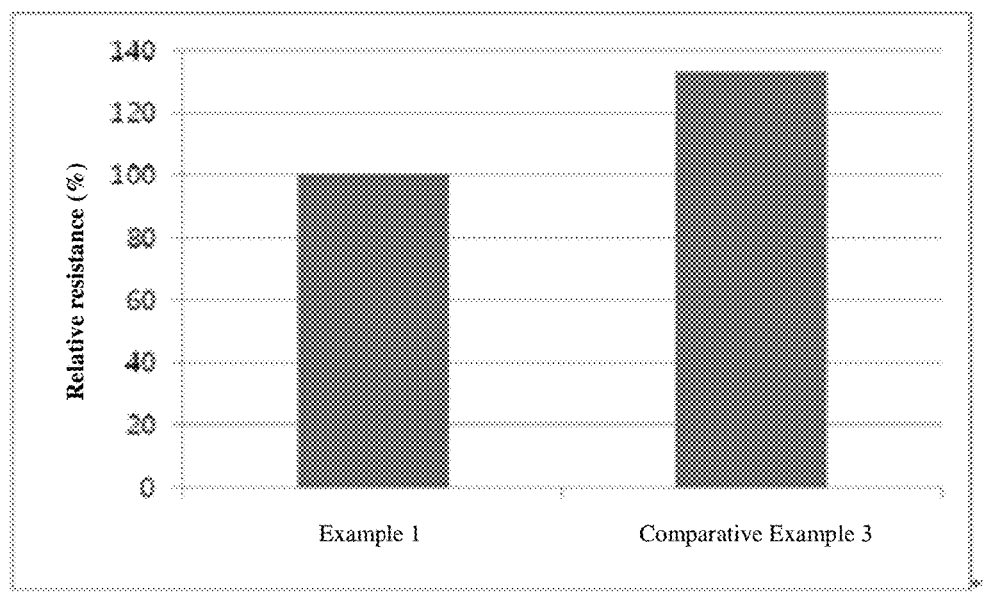

[ FIG. 5 ]
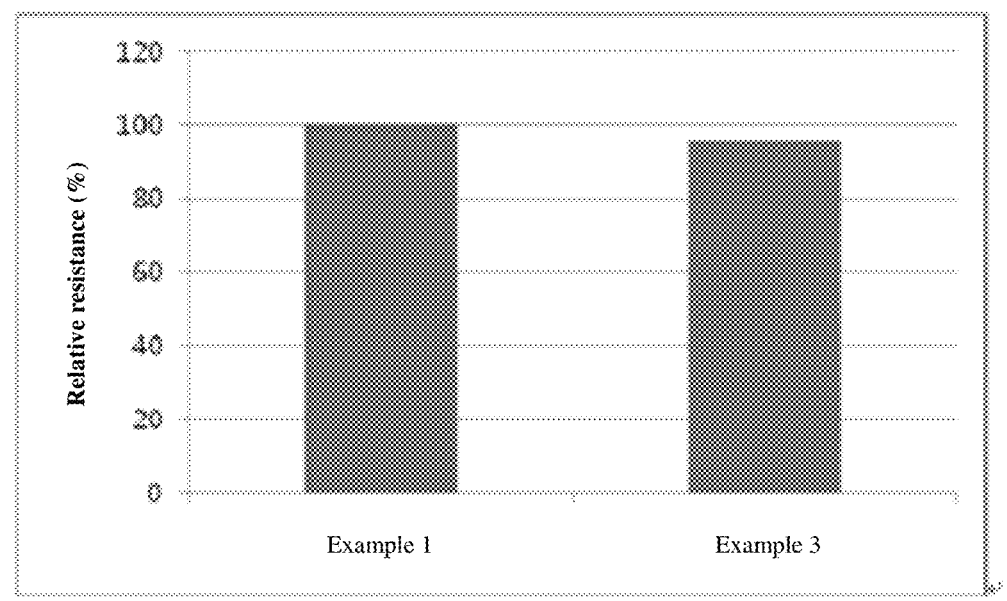

LITHIUM SECONDARY BATTERY

CROSS-REFERENCE TO RELATED APPLICATION

This application is a national phase entry under 35 U.S.C. §371 of International Application No. PCT/KR2013/010625, filed Nov. 21, 2013, which claims priority to Korean Patent Application No. 10-2012-0132413, filed on Nov. 21, 2012 and Korean Patent Application No. 10-2013-0142114, filed on Nov. 21, 2013, the disclosures of which are incorporated herein by reference.

TECHNICAL FIELD

The present invention relates to a lithium secondary battery including a cathode active material and an anode active material. More particularly, the present invention relates to a lithium secondary battery including (i) a cathode active material including a lithium metal phosphate according to Formula 1 below; and (ii) an anode active material including amorphous carbon,

$$Li_{1+a}M(PO_{4-b})X_b \qquad (1)$$

wherein M is at least one selected from metals of Groups II to XII, X is at least one selected from F, S and N, $-0.5 \leq a \leq +0.5$, and $0 \leq b \leq 0.1$.

BACKGROUND ART

Demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized. Accordingly, research into secondary batteries, which may meet a variety of requirements, is being actively performed. In particular, there is high demand for lithium secondary batteries having high energy density, high discharge voltage, and output stability.

In particular, lithium secondary batteries used in hybrid electric vehicles must exhibit great output in short time and be used for 10 years or more under harsh conditions of repeated charge and discharge on a daily basis. Therefore, there are inevitable requirements for a lithium secondary battery exhibiting superior stability and output characteristics to existing small-sized lithium secondary batteries.

In connection with this, existing lithium secondary batteries generally use a lithium cobalt composite oxide having a layered structure, as a cathode and a graphite-based material as an anode. However, $LiCoO_2$ has advantages such as superior energy density and high-temperature characteristics while having disadvantages such as poor output characteristics. Due to such disadvantages, high output temporarily required at abrupt driving and rapid accelerating is provided from a battery and thus $LiCoO_2$ is not suitable for use in hybrid electric vehicles (HEVs) which require high output. In addition, due to characteristics of a method of preparing $LiNiO_2$, it is difficult to apply $LiNiO_2$ to actual production processes at reasonable cost. Furthermore, lithium manganese oxides such as $LiMnO_2$, $LiMn_2O_4$, and the like exhibit drawbacks such as poor cycle characteristics and the like.

Accordingly, a method of using a lithium transition metal phosphate as a cathode active material is under study. The lithium transition metal phosphate is broadly classified into $Li_xM_2(PO_4)_3$ having a NaSICON structure and $LiMPO_4$ having an olivine structure, and considered as a material having superior stability, when compared with existing $LiCoO_2$. At present, $Li_3V_2(PO_4)_3$ having a NaSICON structure is known and as compounds having an olivine structure, $LiFePO_4$ and $Li(Mn, Fe)PO_4$ are the most broadly researched. However, due to low electron conductivity of $LiFePO_4$, internal resistance of a battery increases when $LiFePO_4$ is used as a cathode active material and thus polarized potential increases when battery circuits are closed, thereby resulting in reduction of battery capacity.

Meanwhile, a carbon-based active material is mainly used as an anode active material. The carbon-based active material has a very low discharge potential of approximately −3 V, and exhibits extremely reversible charge/discharge behavior due to uniaxial orientation of a graphene layer, thereby exhibiting superior electrode cycle life.

An electrode potential of the carbon-based active material is 0 V (Li/Li+) during charging of Li ions and thus may exhibit a potential similar to pure lithium metal. Accordingly, greater energy may be obtained when a cathode and a battery including a lithium transition metal oxide are formed.

Examples of the carbon-based active material include crystalline graphite such as natural graphite, synthetic graphite and the like, and amorphous carbon such as soft carbon, hard carbon and the like. The crystalline graphite has high energy density but relatively poor output characteristics, thereby being unsuitable for energy sources for hybrid electric vehicles (HEVs) requiring high output.

Therefore, a lithium secondary battery meeting all of the characteristics such as high output, long cycle life and conservation lifespan, high stability, and the like is preferred as a secondary battery for hybrid electric vehicles (HEVs). However, such a lithium secondary battery is still under development.

DISCLOSURE

Technical Problem

The present invention aims to address the aforementioned problems of the related art and to achieve technical goals that have long been sought.

As a result of a variety of intensive studies and various experiments, the inventors of the present invention confirmed that, when a lithium secondary battery including a predetermined lithium metal phosphate as a cathode active material and amorphous carbon as an anode active material is used, desired effects may be accomplished, thus completing the present invention.

Technical Solution

In accordance with one aspect of the present invention, provided is a lithium secondary battery including:
(i) a cathode active material including a lithium metal phosphate according to Formula 1 below; and
(ii) an anode active material including amorphous carbon,

$$Li_{1+a}M(PO_{4-b})X_b \qquad (1)$$

wherein M is at least one selected from metals of Groups II to XII, X is at least one selected from F, S and N, $-0.5 \leq a \leq +0.5$, and $0 \leq b \leq 0.1$.

Inventors of the present invention confirmed that, in the case of the lithium secondary battery using the predetermined lithium metal phosphate and the amorphous carbon, low resistance and superior output characteristics are exhibited and thus may be suitably used particularly in hybrid electric vehicles.

In particular, the lithium metal phosphate may be lithium iron phosphate, which has an olivine crystal structure, according to Formula 2 below:

$$Li_{1+a}Fe_{1-x}M'_x(PO_{4-b})X_b \quad (2)$$

wherein M' is at least one selected from Al, Mg, Ni, Co, Mn, Ti, Ga, Cu, V, Nb, Zr, Ce, In, Zn, and Y, X is at least one selected from F, S, and N, $-0.5 \leq a \leq +0.5$, $0 \leq x \leq 0.5$, and $0 \leq b \leq 0.1$.

When values of a, b and x are outside the above ranges, conductivity is reduced or it is impossible to maintain the olivine structure of the lithium iron phosphate. In addition, rate characteristics are deteriorated or capacity may be reduced.

More particularly, the lithium metal phosphate having the olivine crystal structure may be $LiFePO_4$, $Li(Fe, Mn)PO_4$, $Li(Fe, Co)PO_4$, $Li(Fe, Ni)PO_4$, or the like, more particularly $LiFePO_4$.

That is, the lithium secondary battery according to the present invention uses $LiFePO_4$ as a cathode active material and amorphous carbon as an anode active material, and thus internal resistance increase, which causes low electrical conductivity of $LiFePO_4$, may be resolved, and superior high-temperature stability and output characteristics may be exhibited.

The lithium-containing phosphate may be composed of second particles in which first particles are physically aggregated.

An average particle diameter of the first particles may be 1 to 300 nm and an average particle diameter of the second particles may be 4 to 40 micrometers. Particularly, an average particle diameter of the first particles may be 10 to 100 nm and an average particle diameter of the second particles may be 2 and 30 micrometers. More particularly, an average particle diameter of the second particles may be 3 to 15 micrometers.

When an average particle diameter of the first particles is excessively large, desired improvement of ionic conductivity may not be exhibited. On the other hand when an average particle diameter of the first particles is excessively small, it is not easy to manufacture a battery. In addition, when an average particle diameter of the second particles is excessively large, bulk density is reduced. On the other hand when an average particle diameter of the second particles is excessively small, a process may not be effectively performed.

A specific surface area (BET) of the second particles may be 3 to 40 $m^2/g$.

The lithium metal phosphate may be coated with a conductive material to increase electrical conductivity and the conductive material may be at least one selected from conductive carbon, precious metal, metal, and conductive polymers. In particular, it is desirable to coat the lithium metal phosphate with conductive carbon since conductivity may be effectively improved without dramatic increase in preparation costs and weights.

The amount of the conductive carbon may be greater than 2 and 5 wt % or less, particularly 2.5 to 5 wt %, based on a total weight of the cathode active material. When the amount of the conductive carbon is excessively large, the amount of the lithium metal phosphate is relatively reduced, thereby deteriorating total characteristics of a battery. On the other hand excessively small amount of the conductive carbon is undesirable since it is difficult to improve electrical conductivity.

The conductive carbon may be coated over a surface of each of the first particles and the second particles. For example, the conductive carbon may be coated to a thickness of 0.1 to 10 nanometers over surfaces of the first particles and to a thickness of 0.1 to 20 nanometers over surfaces of the second particles.

When the first particles are coated with 0.5 to 1.5 wt % of the conductive carbon based on a total weight of the cathode active material, a thickness of the carbon coating layer may be approximately 0.1 to 2.0 nanometers.

In the present invention, the amorphous carbon is a carbon-based compound except for crystalline graphite and for example, may be hard carbon and/or soft carbon. The amorphous carbon may be prepared through a process including thermal-treatment at 1800 or less. For example, the hard carbon may be prepared through thermal decomposition of a phenolic resin or a furan resin and the soft carbon may be prepared through carbonization of coke, needle coke, or pitch.

An X-ray diffraction (XRD) spectrum of an anode, in which the amorphous carbon was used, is illustrated in FIG. 1.

The hard carbon, the soft carbon, or a mixture thereof may be used as an anode active material. In the case of the mixture, the hard carbon and the soft carbon, for example, may be mixed in a weight ratio of 5:95 to 95:5 based on a total weight of the anode active material.

An average particle diameter of the amorphous carbon, for example, may be 5 to 20 micrometers and a specific surface area with respect to a capacity thereof may be 0.001 to 0.055 $m^2/mAh$.

The average particle diameter and the specific surface area with respect to capacity of the amorphous carbon are an optimal range to exhibit effects in accordance with the present invention. Accordingly, average particle diameters and specific surface areas with respect to capacity, which are greater or smaller than the range, are not desirable.

Hereinafter, a composition of the lithium secondary battery according to the present invention will be described.

The lithium secondary battery according to the present invention includes a cathode, which is prepared by coating a mixture of the cathode active material, a conductive material, and a binder on a cathode current collector and drying and pressing the coated cathode current collector, and an anode prepared using the same method as that used to manufacture the cathode. In this case, the mixture may further include a filler as desired.

The cathode current collector is generally fabricated to a thickness of 3 to 500 micrometers. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is typically added in an amount of 1 to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

An anode current collector is typically fabricated to a thickness of 3 to 500 micrometers. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material. In addition, the anode current collector may be used in various forms including films, sheets, foils, nets, porous structures, foams, and non-woven fabrics.

The lithium secondary battery may have a structure in which an electrode assembly, which includes a cathode, an anode, and a separator disposed between the cathode and the anode, is impregnated with the electrolyte.

The separator is disposed between the cathode and the anode and an insulating thin film having high ion permeability and mechanical strength is used as the separator. The separator typically has a pore diameter of 0.01 to 10 micrometers and a thickness of 5 to 300 micrometers. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium salt-containing electrolyte is composed of an electrolyte and a lithium salt. As the electrolyte, a non-aqueous organic solvent, an organic solid electrolyte, an inorganic solid electrolyte, and the like may be used, but the present invention is not limited thereto.

The non-aqueous organic solvent may be at least one solvent selected from the group consisting of carbonate-based solvents, ester-based solvents, ether-based solvents, and ketone-based solvents. In particular, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, and $Li_3PO_4-Li_2S-SiS_2$.

The lithium salt is a material that is readily soluble in the non-aqueous electrolyte. Examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides. Concentration of the lithium salt in an electrolyte may be 0.5 to 3 M.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

The battery pack including one or more lithium secondary batteries described above may be used as a power source for devices that require stability at high temperature, long cycle life, and high rate characteristics.

Examples of the devices include electric vehicles, hybrid electric vehicles (HEVs), plug-in hybrid electric vehicles (PHEVs), and the like, and the secondary battery according to the present invention may be desirably used in hybrid electric vehicles due to superior output characteristics thereof.

Recently, research into use of a lithium secondary battery in power storage devices, in which unused power is converted into physical or chemical energy for storage and when necessary, the converted energy is used as electric energy, is being actively performed.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a graph illustrating an X-ray diffraction (XRD) spectrum of an anode, to which amorphous carbon according to the present invention is applied;

FIG. 2 is a graph illustrating relative resistances of secondary batteries according to Experimental Example 1 of the present invention;

FIG. 3 is a graph illustrating relative resistances of secondary batteries according to Experimental Example 2 of the present invention;

FIG. 4 is a graph illustrating relative resistances of secondary batteries according to Experimental Example 3 of the present invention; and FIG. 5 is a graph illustrating relative resistances of secondary batteries according to Experimental Example 4 of the present invention.

MODE FOR INVENTION

Now, the present invention will be described in more detail with reference to the following examples. These examples are provided only for illustration of the present invention and should not be construed as limiting the scope and spirit of the present invention.

EXAMPLE 1

As a cathode active material, LiFePO4 having a first particle size of approximately 100 to 200 nanometers and composed of second particles including 4 wt% of carbon based on the total weight of the cathode active material was used.

86 wt % of the $LiFePO_4$ as a cathode active material, 8 wt % Super-P as a conductive material, and 6 wt % PVdF as a binder were added to NMP to prepare a cathode mixture slurry. The resulting cathode mixture slurry was coated, dried, and pressed over one side of aluminum foil to prepare a cathode.

As an anode active material, soft carbon having a particle size of approximately 15 micrometers was used.

93.5 wt % of the soft carbon as an anode active material, 2 wt % Super-P as a conductive material, and 3 wt % SBR as a binder, and 1.5 wt % CMC as a thickener were added to water as a solvent to prepare an anode mixture slurry. The resulting anode mixture slurry was coated, dried, and pressed over one side of copper foil to prepare an anode.

The cathode and the anode were laminated using Celgard™ as a separator to prepare an electrode assembly. Subsequently, a lithium non-aqueous electrolyte including 1 M $LiPF_6$ was added to a mixture of circular and linear carbonates, to prepare a lithium secondary battery.

EXAMPLE 2

A lithium secondary battery was manufactured in the same manner as in Example 1, except that $LiFePO_4$ having a first particle size of approximately 100 to 200 nanometers and composed of second particles including 3 wt % of carbon based on the total weight of the cathode active material was used as a cathode active material.

EXAMPLE 3

A lithium secondary battery was manufactured in the same manner as in Example 1, except that soft carbon having a particle size of approximately 8 micrometers was used as an anode active material.

COMPARATIVE EXAMPLE 1

A lithium secondary battery was manufactured in the same manner as in Example 1, except that $LiFePO_4$ having a first particle size of approximately 100 to 200 nanometers and composed of second particles including 2 wt % of carbon based on the total weight of the cathode active material was used as a cathode active material.

COMPARATIVE EXAMPLE 2

A lithium secondary battery was manufactured in the same manner as in Example 1, except that $LiFePO_4$ having a first particle size of approximately 100 to 200 nanometers and composed of only first particles including 4 wt % of carbon based on the total weight of the cathode active material was used as a cathode active material.

COMPARATIVE EXAMPLE 3

A lithium secondary battery was manufactured in the same manner as in Example 1, except that $LiFePO_4$ having a second particle size of approximately 3 nanometers and identical properties to Example 1 was used as a cathode active material.

EXPERIMENTAL EXAMPLE 1

Relative resistances of the batteries prepared according to Examples 1 and 2, and Comparative Example 1 were measured under a condition of 3 cycles (CC discharge→rest for 20 min→CC/CV charge)→rest for 30 min→9 cycles× (CC discharge at 10% SOC→rest for 1 hr→10 C discharge for 10 s→rest for 30 min→10 C charge for 10 s→rest for 30 min) Results are illustrated in FIG. 2 below.

As shown in FIG. 2, relative resistance decreases with increasing the amount of carbon coated over the cathode active material. In the case of the battery of Comparative Example 2, it can be confirmed through EIS analysis that a contact resistance between active materials dramatically increases. Therefore, the amount of carbon coating is preferably greater than 2 wt %. A battery may be realized by increasing the amount of an additional conductive material when the amount does not exceed 2 wt %, but is not desirable with respect to energy density and output density.

EXPERIMENTAL EXAMPLE 2

Relative resistances of the lithium secondary batteries prepared according to Examples 1 and 2 and Comparative Example 2 were measured under identical conditions to Experimental Example 1. Results are illustrated in FIG. 3 below.

As shown in FIG. 3 below, it can be confirmed that, despite having a small amount of the carbon, a relative resistance of the battery using $LiFePO_4$ composed of second particles is lower than a resistance of the battery using $LiFePO_4$ composed of first particles. In the case of $LiFePO_4$ composed of first particles, it can be confirmed that $LiFePO_4$ composed of the second particles contacts the current collector when a binder layer is formed between $LiFePO_4$ and the current collector and increased contact resistance is thus observed through SEM analysis.

EXPERIMENTAL EXAMPLE 3

Relative resistances of the lithium secondary batteries prepared according to Example 1 and Comparative Example 3 were measured under identical conditions to Experimental Example 1. Results are illustrated in FIG. 4 below.

As shown in FIG. 4, relative resistance decreases with increasing second particle size. Although it is considered that such a phenomenon occurs due to reduced contact resistance through easy contact with a current collector, as described in FIG. 3, it is significant that a contact resistance converges on a constant state with increasing particle sizes and then the resistance increases with increasing particle size.

EXPERIMENTAL EXAMPLE 4

Relative resistances of the lithium secondary batteries prepared according to Examples 1 and 3 were measured under identical conditions to Experimental Example 1. Results are illustrated in FIG. 5 below.

As shown in FIG. 5, resistance of a battery decreases with decreasing particle size of the anode. However, the particle size directly relates to lifespan and it thus is not desirable to unconditionally reduce the particle sizes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a secondary battery according to the present invention uses a predetermined lithium metal phosphate as a cathode active material, thereby increasing high-temperature stability. In addition, amorphous carbon is used as an anode active material, thereby decreasing resistance. Accordingly, superior rate characteristics and output characteristics are exhibited and thus the secondary battery may be suitably used in hybrid electric vehicles.

The invention claimed is:

1. A lithium secondary battery comprising:
a cathode active material comprising a lithium iron phosphate having an olivine crystal structure and a conductive carbon, where the conductive carbon is directly disposed on the surface of the lithium iron phosphate; and
an anode active material comprising amorphous carbon,
wherein the lithium iron phosphate comprises second particles in which first particles are physically aggregated,
wherein the surfaces of the first particles and the second particles are each coated with the conductive carbon,
wherein the first particles have an average particle size of 1 nanometer to 300 nanometers and having a coating of the conductive material having a thickness ranging from 0.1 nm to 10 nm, and the second particles have an average particle size of 4 micrometers to 15 micrometers and having a coating of the conductive material having a thickness ranging from 0.1 nm to 20 nm,
wherein an amount of the conductive carbon is greater than 2 wt % and 5 wt % or less, based on a total weight of the cathode active material,
wherein the lithium iron phosphate having the olivine crystal structure is $LiFePO_4$,
wherein the amorphous carbon is soft carbon, and
wherein the amorphous carbon has an average particle size of 8 micrometers to 15 micrometers.

2. A battery module comprising the lithium secondary battery according to claim 1 as a unit cell.

3. A battery pack comprising the battery module according to claim 2.

4. A device comprising the battery pack according to claim 3.

5. The device according to claim 4, wherein the device is a hybrid electric vehicle, a plug-in hybrid electric vehicle, or a system for storing power.

6. The lithium secondary battery of claim 1, wherein the anode active material consisting essentially of amorphous carbon.

* * * * *